US009064250B1

(12) United States Patent
Sargeant (10) Patent No.: US 9,064,250 B1
(45) Date of Patent: Jun. 23, 2015

(54) SYSTEM AND METHOD FOR BILLING AN ACCOUNT (75) Inventor: Patrick Thomas Sargeant, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 804 days.

(21) Appl. No.: 11/924,600

(22) Filed: Oct. 25, 2007

(51) Int. Cl.
| G07F 19/00 | (2006.01) |
| H04M 15/00 | (2006.01) |
| G06Q 20/10 | (2012.01) |
| G06Q 30/04 | (2012.01) |
| G06Q 40/00 | (2012.01) |
| G06Q 40/02 | (2012.01) |

(52) U.S. Cl.
CPC .............. *G06Q 20/102* (2013.01); *G06Q 30/04* (2013.01); *G06Q 40/10* (2013.01); *G06Q 40/02* (2013.01); *G06Q 40/00* (2013.01)

(58) Field of Classification Search
USPC ............................................................ 705/34
See application file for complete search history.

(56) References Cited

U.S. PATENT DOCUMENTS

| 4,831,526 | A | * | 5/1989 | Luchs et al. ........................ 705/4 |
| 2001/0056433 | A1 | * | 12/2001 | Adelson et al. ............. 707/104.1 |
| 2003/0093302 | A1 | * | 5/2003 | Quido et al. ........................ 705/4 |
| 2004/0081302 | A1 | * | 4/2004 | Kim et al. ................. 379/114.22 |
| 2004/0143464 | A1 | * | 7/2004 | Houle et al. ........................ 705/4 |
| 2004/0259525 | A1 | * | 12/2004 | Kotzin ........................... 455/406 |
| 2004/0260631 | A1 | * | 12/2004 | Leventhal ......................... 705/30 |
| 2005/0171898 | A1 | * | 8/2005 | Bishop et al. ................... 705/39 |
| 2005/0192849 | A1 | * | 9/2005 | Spalding, Jr. ..................... 705/4 |
| 2008/0064446 | A1 | * | 3/2008 | Camp et al. .................... 455/565 |
| 2008/0110973 | A1 | * | 5/2008 | Nathans et al. ............... 235/379 |
| 2008/0120210 | A1 | * | 5/2008 | Leventhal ......................... 705/30 |

OTHER PUBLICATIONS

Cingular. "Split Billing Attachment." AT&T, Nov. 17, 2006.
Federal Communications Commission. "Report and Order: In the Matter of Transport Rate Structure and Pricing Resale, Shared Use and Split Billing." FCC, Mar. 5, 1998, [retrieved from the Internet on Jan. 24, 2008 using <URL: http://www.fcc.gov/Bureaus/Common_Carrier/Orders/1998/fcc98030.txt>].
The CPA Technology Advisor. "LexisNexis Time Matters Software—Billing Matters Plus." The CPA Technology Advisor, Dec. 2004, [retrieved from the Internet on Jan. 24, 2008 using <URL: http://www.timematters.com/news/reviews/cpata-bm6p.asp>].
Gneezy, U., Haruvy, E. and Yafe, H. "The Inefficiency Of Splitting The Bill." The Economic Journal, Apr. 2004, vol. 114, p. 265-280.

* cited by examiner

*Primary Examiner* — Fateh Obaid
(74) *Attorney, Agent, or Firm* — Baker & Hostetler LLP (57) ABSTRACT

Methods and systems are disclosed for issuing bills on an account to a primary account holder and at least one secondary account holder. The methods and systems allow separate component bills to be sent to the primary and secondary account holders based on instructions received from the primary account holder. In one embodiment, the component bills represent the portion of the total bill that is attributable to the recipient of the component bill. In another embodiment, payment reminders are sent to the primary and secondary account holders before the payment deadline. Account identification information can be encoded on each payment received from a primary or secondary account holder so that the payment can be properly credited to the account.

18 Claims, 5 Drawing Sheets

SYSTEM AND METHOD FOR BILLING AN ACCOUNT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to billing systems and, more specifically, to systems and methods for sending a separate bill to a secondary account holder designated by a primary account holder.

BACKGROUND

Traditionally, a household's bills are paid by the head of the household, who is an adult. If the household includes children, those children usually do not receive any bills of their own. Most children never begin receiving bills of their own until they move out of their parents' home to go to college or pursue other options. Sometimes a household has insurance policies, such as for automobile insurance or health insurance, to which a child may be added. However, the insurance premium amount increases when a child is included on the same policy with the other members of the household. Although such premiums may be higher when the child is included on the same policy with the rest of the household, the total premium in most cases would be higher still if the child had his or her own, individual policy. This is because many insurers give a discount to customers who purchase multiple insurance products.

It is desirable to allow a child to be carried on the parents' or guardians' policies for as long as possible, to prevent the child from having to pay the very high premiums associated with having an individual policy. It is also desirable to teach children responsible financial practices and attitudes before they attain independence. Embodiments of the systems and methods of this disclosure provide these and other advantages.

SUMMARY

The disclosed embodiments are directed to methods and systems for billing accounts. The methods and systems relate to sending separate bills for the same account to different persons. In one implementation, the methods and systems include a billing system for insurance policies, wherein a separate bill can be sent to a child who is included on the policy. In one embodiment, the separate bill reflects the portion of the premium attributable to the child being included on the policy. In another embodiment, the separate bill reflects an amount of the total bill that the account owner wants the recipient of the separate bill, such as a child, to receive.

BRIEF DESCRIPTION OF THE DRAWINGS

The foregoing and other advantages of the invention will become apparent from the following detailed description and upon reference to the drawings, wherein.

DETAILED DESCRIPTION

The drawings noted above and the written description of specific systems and methods below are not presented to limit the scope of what has been invented or the scope of the appended claims. Rather, the drawing and written description are provided to teach any person skilled in the art to make and use that for which patent protection is sought. Those skilled in the art will appreciate that, for the sake of clarity and understanding, not all features of a commercial embodiment within the scope of the appended claims are described or shown.

Persons of skill in this art will also appreciate that the development of an actual commercial embodiment will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having the benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of what has been invented or the scope of the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Figure 1:
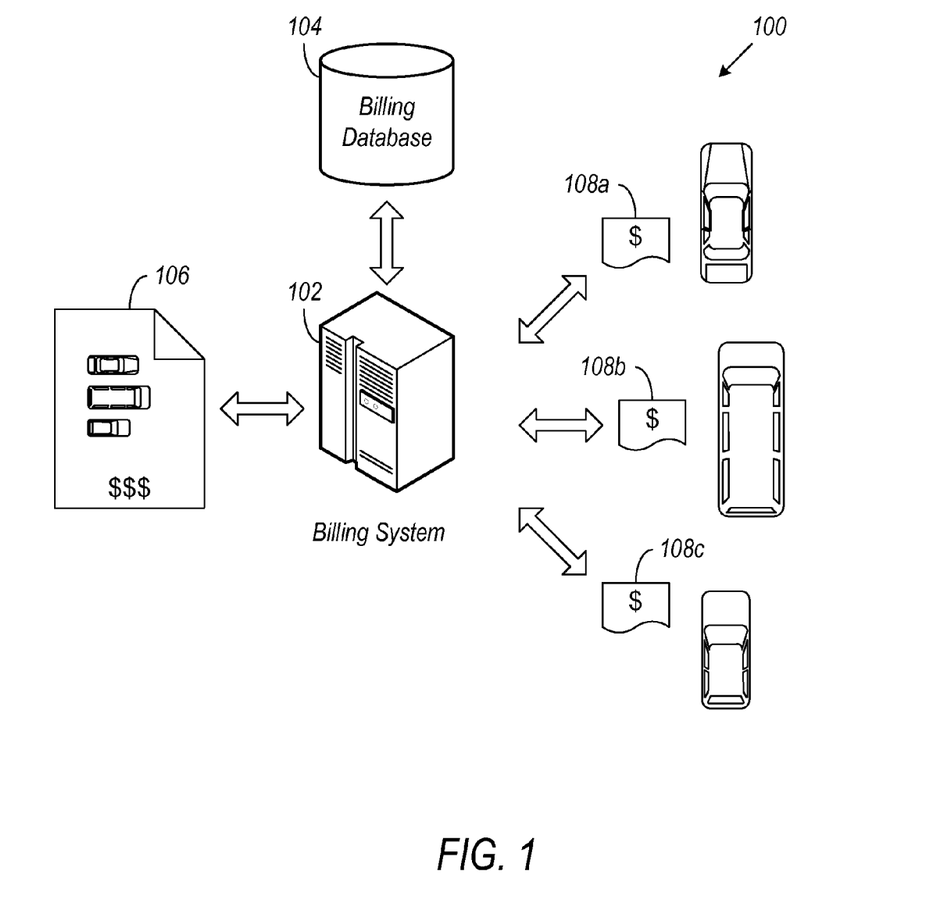
FIG. 1 illustrates an exemplary infrastructure for providing component billing according to the disclosed embodiments.

The disclosed embodiments relate to a billing system in which separate bills, or component bills, are sent to the primary account holder and one or more designated secondary account holders (e.g., spouse, dependent child). An exemplary infrastructure 100 for such a billing system is illustrated in FIG. 1. As can be seen, the billing system 102 is connected to a billing database 104 for generating bills 106 for various accounts. The accounts in this example are car insurance policies, but those having ordinary skill in our will readily see that the disclosed embodiments are fully applicable to other types of accounts.

In operation, the billing system 102 receives instructions from a primary account holder regarding the amount that should be billed to each secondary account holder. The billing system 102 then generates separate or component bills 108a, 108b, and 108c for the primary account holder and each secondary account holder, and sends each bill to the corresponding primary or secondary account holder. Despite the component bills, the primary policy holder remains ultimately responsible for all bills. However, billing a secondary holder account separately in this manner may help younger family members learn fiscal responsibility while helping to qualify the family for deeper discounts, such as multi-fecal rates lower rates for younger drivers under parent policies.

Other advantages of the disclosed embodiments may include the ability to bill different vehicles under the same policy to different addresses/persons. The billing system 102 may also send reminders may be sent to the secondary account holder (and primary account holder) that payment is due as a way to further teach fiscal responsibility to younger family members.

Figure 2:
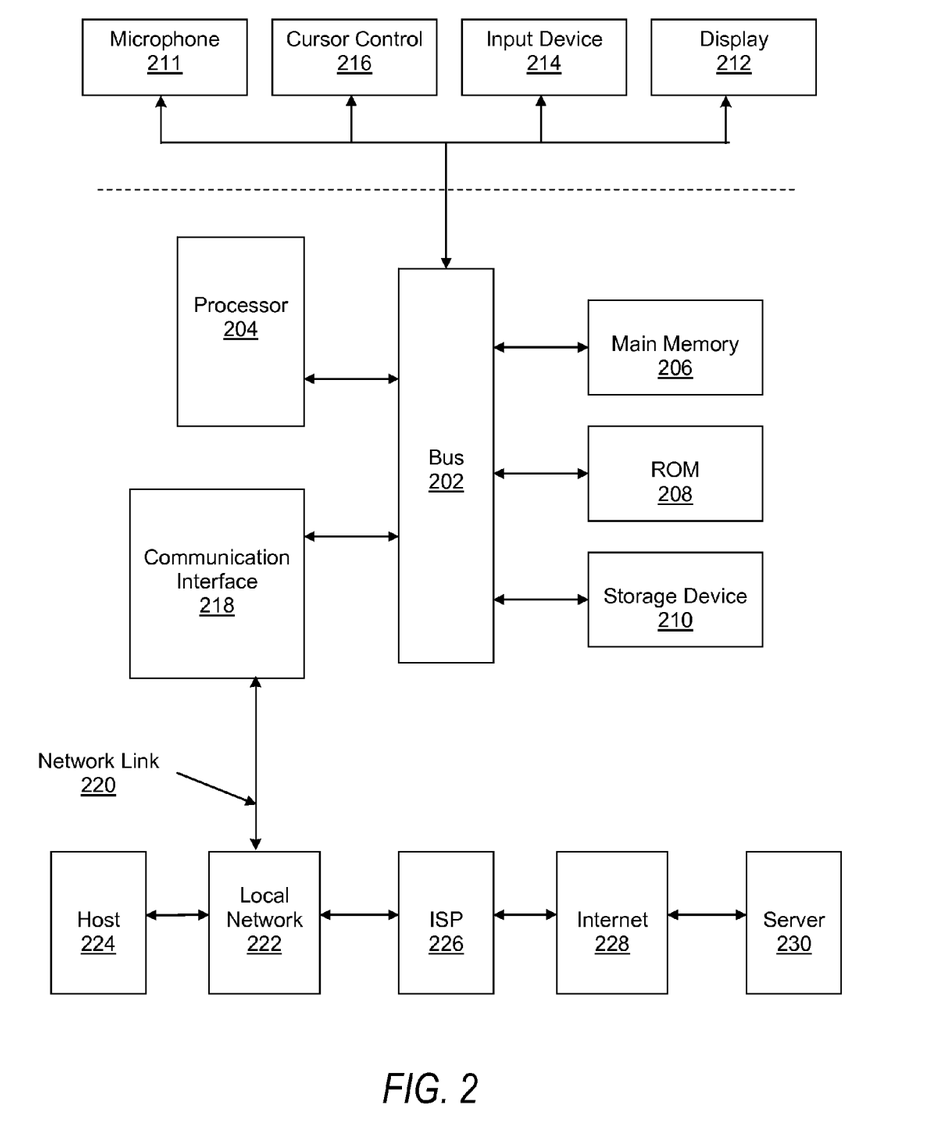
FIG. 2 illustrates, in block diagram form, an exemplary computer system upon which a disclosed embodiment may be implemented, or reside, in whole or in part.

Referring to FIG. 2, a block diagram illustrates an exemplary computer or computing system 200 upon which process flows in accordance with principles of embodiments may be implemented or on which embodiments themselves may reside. Computer or computing system 200 includes a bus 202 or other communication mechanism for communicating information, and a processor 204 coupled with bus 202 for processing information. Computer or computing system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer or computing system 200 further includes a read only memory (ROM) 208 or other static storage device coupled to bus 202 for storing static information and instructions for processor 204. A storage device 210, such as a magnetic disk or an optical disk, is provided and coupled to bus 202 for storing information and instructions.

Computer or computing system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane. Microphone 211, another user input device, is coupled to bus 202 for communicating information (e.g., sound signals in the form of voice commands) to processor 204.

One or more populating acts may be provided by computer or computing system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform processes described herein. One or more processors in a multi-processing arrangement may also be employed to execute the sequences of instructions contained in main memory 206. In other embodiments, hard-wired circuitry may be used in place of, or in combination with, software instructions. Thus, embodiments are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or, on the electromagnetic spectrum, light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip, stick or cartridge, a carrier wave as described hereinafter, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer or computing system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network, now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer or computing system 200, are exemplary forms of carrier waves transporting the information.

Computer or computing system 200 can send messages and receive data, including program code, through the network(s), network link 220, and communication interface 218. In the Internet example, a server 230 might transmit a requested code for an application program through Internet 228, ISP 226, local network 222 and communication interface 218. One such application program may provide for, or participate in, sending or receiving data, such as, component bill information, as described herein for various embodiments. The received code may be executed by processor 204 as it is received, and/or stored in storage device 210, or other non-volatile storage for later execution. In this manner, computer or computing system 200 may obtain application code in the form of a carrier wave.

Figure 3:
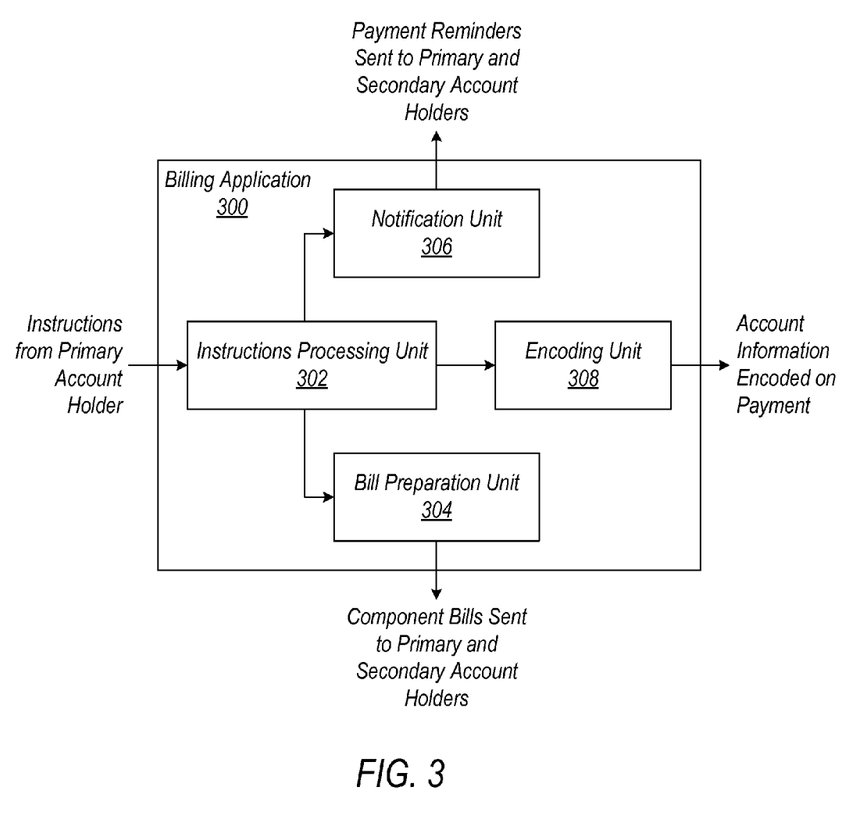
FIG. 3 illustrates an exemplary application for providing component billing according to the disclosed embodiments.

Referring now to FIG. 3, a billing application 300 according to the disclosed embodiments may reside on the storage device 210 of the computer system 200. The billing application may include an instruction processing unit 302 adapted to receive instructions from the primary account holder. These instructions relate to the manner in which the total bill should be apportioned between the primary account holder and one or more secondary account holders. During a billing cycle, the instruction processing unit checks to determine if the primary account holder has provided any instructions regarding apportioning part of the bill to any secondary account holders.

Billing application 300 hostile comprise a bill preparation unit 304. If the primary account holder has not provided any such instructions, then the instruction processing unit directs the bill preparation unit to generate a single bill, called the total bill, reflecting the total amount due on the account. The billing application then sends the total bill to the primary account holder. If the primary account holder has provided instructions regarding apportioning part of the bill to one or more secondary account holders, then the bill preparation unit generates multiple bills, called component bills, according to the instructions provided by the primary account holder. Each component bill reflects the portion of the total amount due according to the primary account holder's designation for payment by the recipient of that component bill.

According to some embodiments, the methods and systems are applied in connection with an automobile insurance policy that provides insurance coverage for multiple members of a household. At least one of the insured persons may be a child between the ages of sixteen and twenty-three years old, while at least another one of the insured persons may be a parent or guardian of the child.

According to some embodiments, a parent or guardian is the primary account holder, and a child of the parent or guardian is the secondary account holder. As the primary account holder, the parent or guardian may instruct the billing application 300 to send a component bill to the child. The amount of the child's component bill may reflect the portion of the insurance premium attributable to the child being included on the policy. Alternatively, the amount of the child's component bill may reflect some other amount that the parent or guardian deems appropriate. The instruction processing unit 302 receives the instructions from the parent or guardian, and directs the bill preparation unit 304 to send an appropriate component bill to the child. Bill preparation unit 304 may also send a component bill to the parent or guardian, wherein this component bill reflects the balance of the premium.

The methods and systems are not limited to automobile insurance policies, but may also be applied to any other type of account, such as utility accounts, cable television accounts, health insurance policies, cellular telephone accounts, credit card accounts, and so on. Furthermore, the methods and systems are not limited to situations in which the primary account holder is the parent or guardian of the secondary account holder. For example, according to some embodiments, the secondary account holder is another adult who shares a residence with the primary account holder. However, the methods and systems are not limited to situations in which the primary account holder and secondary account holder share a residence; for example, a child may be included on a parent's automobile insurance policy even after the child moves out of the family residence to attend college. In this situation, the parent (primary account holder) may instruct the billing application to send the component bill to the child (secondary account holder) at the child's college address rather than to the family residence.

According to some embodiments, billing application 300 further comprises a notification unit 306. Notification unit 306 may send a payment reminder to the primary account holder and the secondary account holder before the component bills are due. The payment reminder may be sent by postal mail, electronic mail, or any other type of transmission. According to some embodiments, bill preparation unit 304 or instruction processing unit 302 may send a payment reminder to the account holder. According to some embodiments, however, no payment reminder may be sent at all.

According to some embodiments, the primary account holder may give authorization for the full amount of the total bill to be paid from the primary account holder's bank account, credit account, or other fund source, in the event that the secondary account holder fails to pay the component bill by the deadline.

According to some embodiments, the component bill issued to the secondary account holder may have a due date that is earlier than the due date of the component bill issued to the primary account holder. In this way, the primary account holder has time before the total bill is due to determine whether in fact the secondary account holder has paid the secondary account holder's component bill. If the secondary account holder failed to pay on time, the primary account holder could follow up with the secondary account holder to determine why the secondary account holder failed to pay. If the secondary account holder persists in not paying the component bill apportioned to the secondary account holder, the primary account holder may pay the full amount of the total bill in a timely manner and avoid being penalized for making a late payment.

According to some embodiments, the billing application further comprises an encoding unit 308. Encoding unit 308 may encode or write an account number or other identifying mark on the check or other payment instrument. This encoded information may assist the billing entity in tracking all payments to the account.

Figure 4:
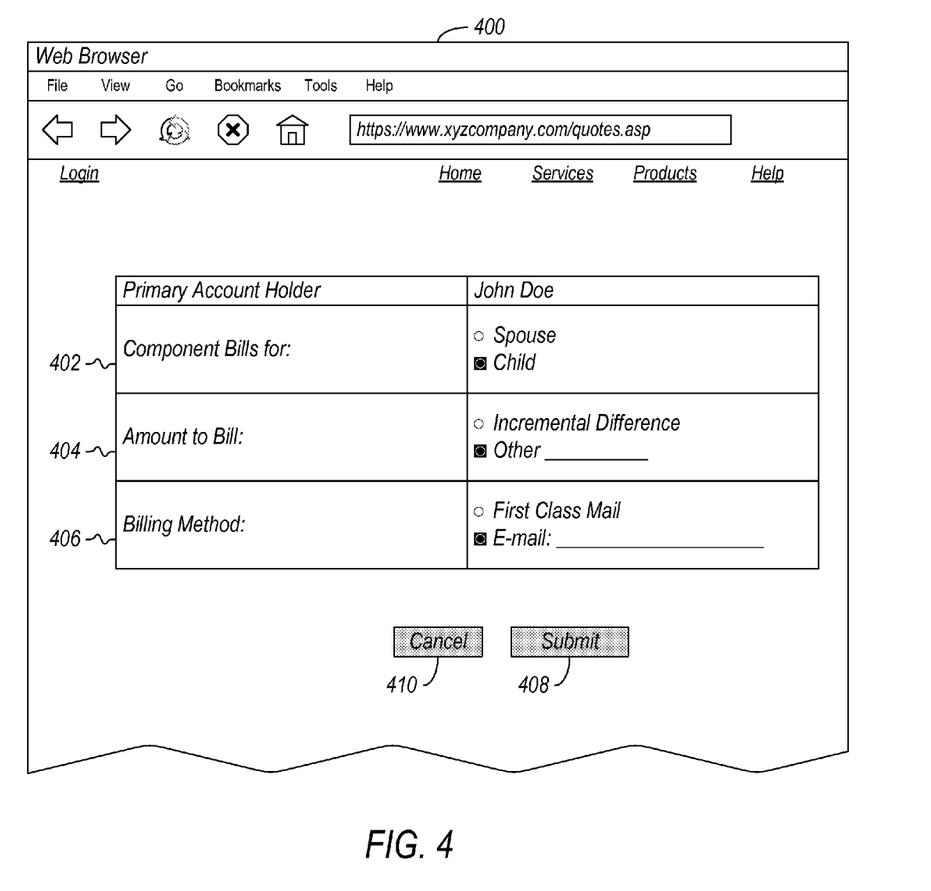
FIG. 4 illustrates an exemplary user interface for providing component billing according to the disclosed embodiments.

FIG. 4 and exemplary user interface 400 for allowing the primary account holder to provide instructions to the billing system 102 (and hence billing application 300). The user interface 400 in this example is a Web-based interface, but other types of interfaces may certainly be used without departing from the disclosed embodiments. As can be seen, the interface may include fields 402 for allowing the primary account holder to specify which secondary account holders, for example, a spouse or a child, will receive component bills. In addition, the user interface 400 also allows primary account holder to specify the amount of the component bills. Such an amount may be the incremental difference resulting from the edition of the secondary account holder on the account, or it may be a specific amount specified by the primary account holder. In some embodiments, the user interface 400 may also include a field of 406 for allowing the primary account holder to specify the billing method, such as first-class mail, e-mail, and the like. Note in FIG. 4 that the user interface 400 only displays fields 404-406 for one secondary account holder because only one secondary account holder has been selected. Additional fields 404-406 may be displayed if additional secondary account holders are selected.

Figure 5:
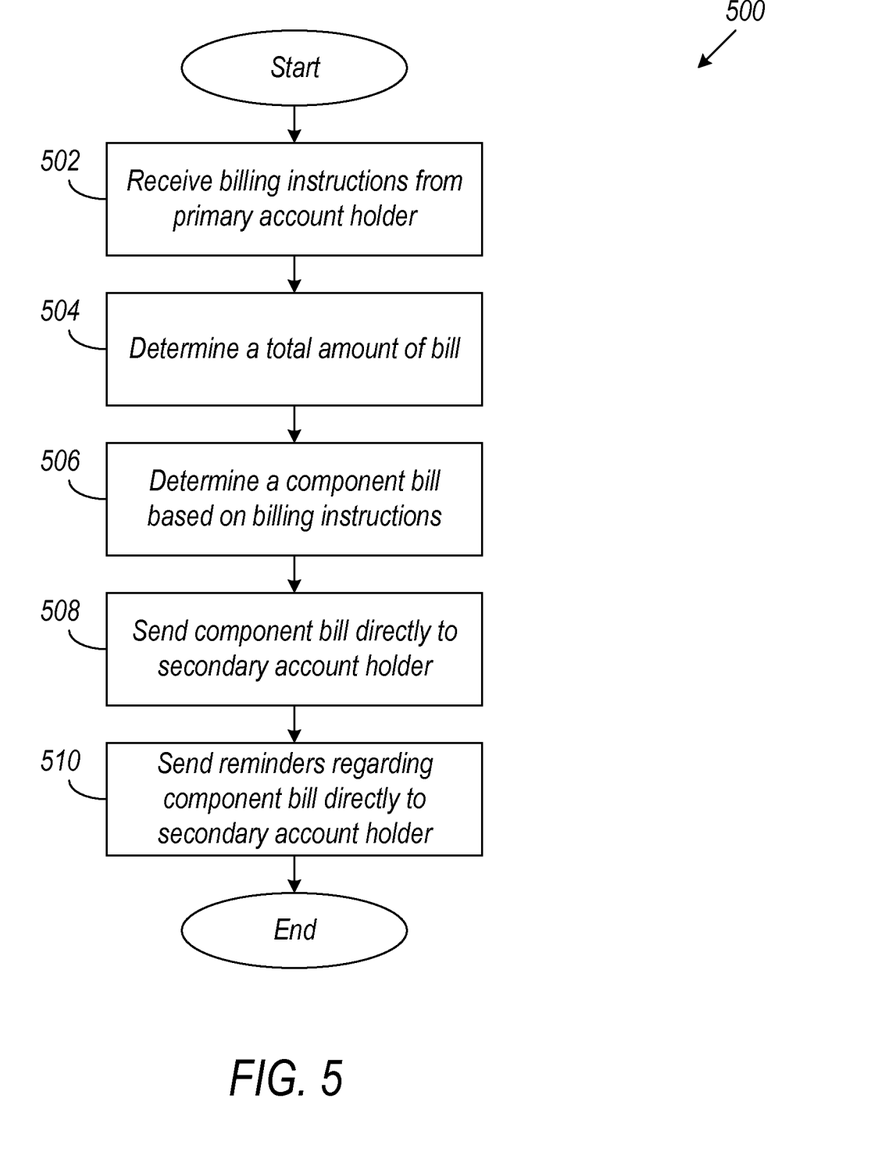
FIG. 5 illustrates an exemplary method for providing component billing according to the disclosed embodiments.

Thus far, specific embodiments have been disclosed for providing component building according to the disclosed embodiments. Referring now to FIG. 5, general guidelines are shown in the form of a method that may be used to implement the various embodiments disclosed above. As can be seen in FIG. 5, a method 500 for providing component building begins at block 502, where billing instructions received from a primary account holder with respect to the component bills. At block 500, for a total bill amount is determined for the account, and at block 506 a component bill amount is determined based on the instructions from the primary account holder. At block 508, a component bill is sent directly to one or more secondary account holders as specified by the primary account holder. Finally at block 510, reminders may be sent to the secondary account holders (and the primary account holder) regarding a payment due for the component bills.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are further set forth in the following claims.

What is claimed is:

1. A system for issuing bills on an account, the system comprising:
   at least one computer processor; and
   memory including computer-readable instructions comprising instructions for causing the processor to:
      determine a total amount due on the account during a billing cycle;
      receive billing instructions from a primary account holder of an insurance policy, the billing instructions including component billing instructions for apportioning bills to the primary account holder of the insurance policy and at least one secondary account holder of the insurance policy, the billing instructions further causing the processor to send a payment reminder directly to the secondary account holder;
      determine first and second portions of the total amount due for the primary account holder and the at least one secondary account holder, respectively, according to the component billing instructions;
      send a bill for the second portion of the total amount due directly to the at least one secondary account holder;
      determine whether the at least one secondary account holder has paid the second portion of the total amount due by a preset deadline; and
      in response to determining that the at least one secondary account holder has not paid the second portion of the total amount due by the preset deadline, bill the primary account holder for the second portion of the total amount due.

2. The system of claim 1, wherein the account is an automobile insurance policy.

3. The system of claim 1, wherein the second portion of the total amount due corresponds to a portion of the total amount due attributable to activities of the secondary account holder.

4. The system of claim 1, wherein the primary account holder is a parent or guardian of the secondary account holder.

5. The system of claim 1, wherein the instructions cause the processor to send a payment reminder to the primary account holder after the payment reminder is sent to the secondary account holder.

6. The system of claim 1, wherein the instructions cause the processor to encode account identification information onto a payment instrument received from the secondary account holder.

7. A computer-implemented method of issuing bills on an account, the method comprising:
   determining a total amount due on the account during a billing cycle;
   receiving billing instructions from a primary account holder of an insurance policy, the billing instructions including component billing instructions for apportioning bills to the primary account holder of the insurance policy and at least one secondary account holder of the insurance policy, the billing instructions including sending a payment reminder directly to the secondary account holder;
   determining by a computer processor first and second portions of the total amount due for the primary account holder and the at least one secondary account holder, respectively, according to the component billing instructions;
   sending a bill for the second portion of the total amount due directly to the at least one secondary account holder;
   determining by a computer processor whether the at least one secondary account holder has paid the second portion of the total amount due by a preset deadline; and
   in response to determining that the at least one secondary account holder has not paid the second portion of the total amount due by the preset deadline, billing by a computer processor the primary account holder for the second portion of the total amount due.

8. The method of claim 7, wherein the account is an automobile insurance policy.

9. The method of claim 7, wherein the second portion of the total amount due corresponds to a portion of the total amount due attributable to activities of the secondary account holder.

10. The method of claim 7, wherein the primary account holder is a parent or guardian of the secondary account holder.

11. The method of claim 7, further comprising sending a payment reminder to the primary account holder after the payment reminder is sent to the secondary account holder.

12. The method of claim 7, further comprising encoding account identification information onto a payment instrument received from the secondary account holder.

13. A computer-readable medium encoded with computer-readable instructions for issuing bills on an account, the computer-readable instructions comprising instructions for causing a computer to:
- determine a total amount due on the account during a billing cycle;
- receive billing instructions from a primary account holder of an insurance policy, the billing instructions including component billing instructions for apportioning bills to the primary account holder of the insurance policy and at least one secondary account holder of the insurance policy, the billing instructions including sending a payment reminder directly to the secondary account holder;
- determine first and second portions of the total amount due for the primary account holder and the at least one secondary account holder, respectively, according to the component billing instructions;
- send a bill for the second portion of the total amount due directly to the at least one secondary account holder;
- determine whether the at least one secondary account holder has paid the second portion of the total amount due by a preset deadline; and
- in response to determining that the at least one secondary account holder has not paid the second portion of the total amount due by the preset deadline, bill the primary account holder for the second portion of the total amount due.

14. The computer-readable medium of claim 13, wherein the account is an automobile insurance policy.

15. The computer-readable medium of claim 13, wherein the second portion of the total amount due corresponds to a portion of the total amount due attributable to activities of the secondary account holder.

16. The computer-readable medium of claim 13, wherein the primary account holder is a parent or guardian of the secondary account holder.

17. The computer-readable medium of claim 13, further comprising computer-readable instructions for causing a computer to send a payment reminder to the primary account holder after the payment reminder is sent to the secondary account holder.

18. The computer-readable medium of claim 13, further comprising computer-readable instructions for causing a computer to encode account identification information onto a payment instrument received from the secondary account holder.

\* \* \* \* \*